July 29, 1941.    L. F. NENNINGER ET AL    2,251,154
MULTIPLE STROKE BROACHING MACHINE
Filed Jan. 3, 1939    5 Sheets-Sheet 1
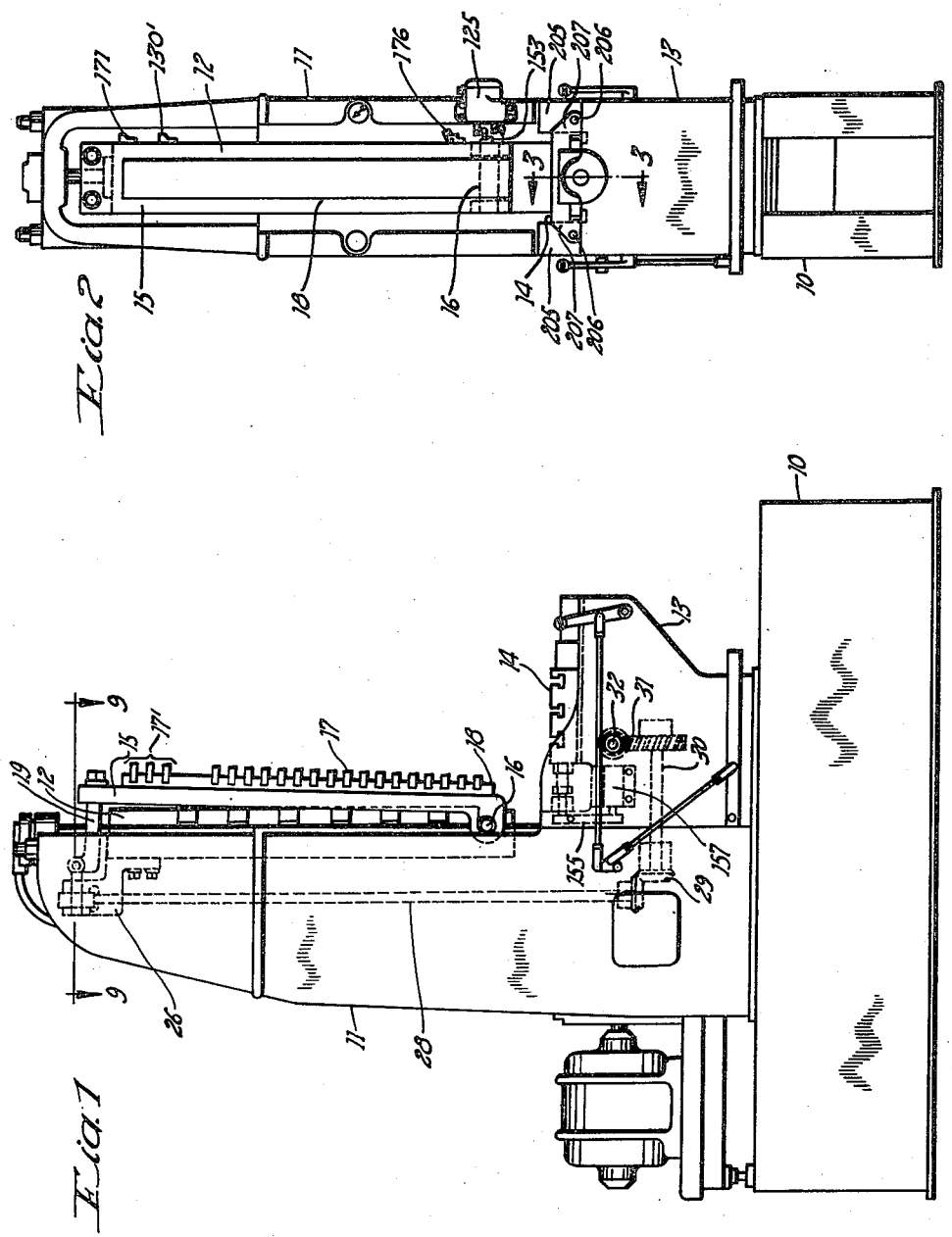
INVENTOR.
LESTER F. NENNINGER
ERWIN G. ROEHM
BY
H. K. Parsons
ATTORNEY.

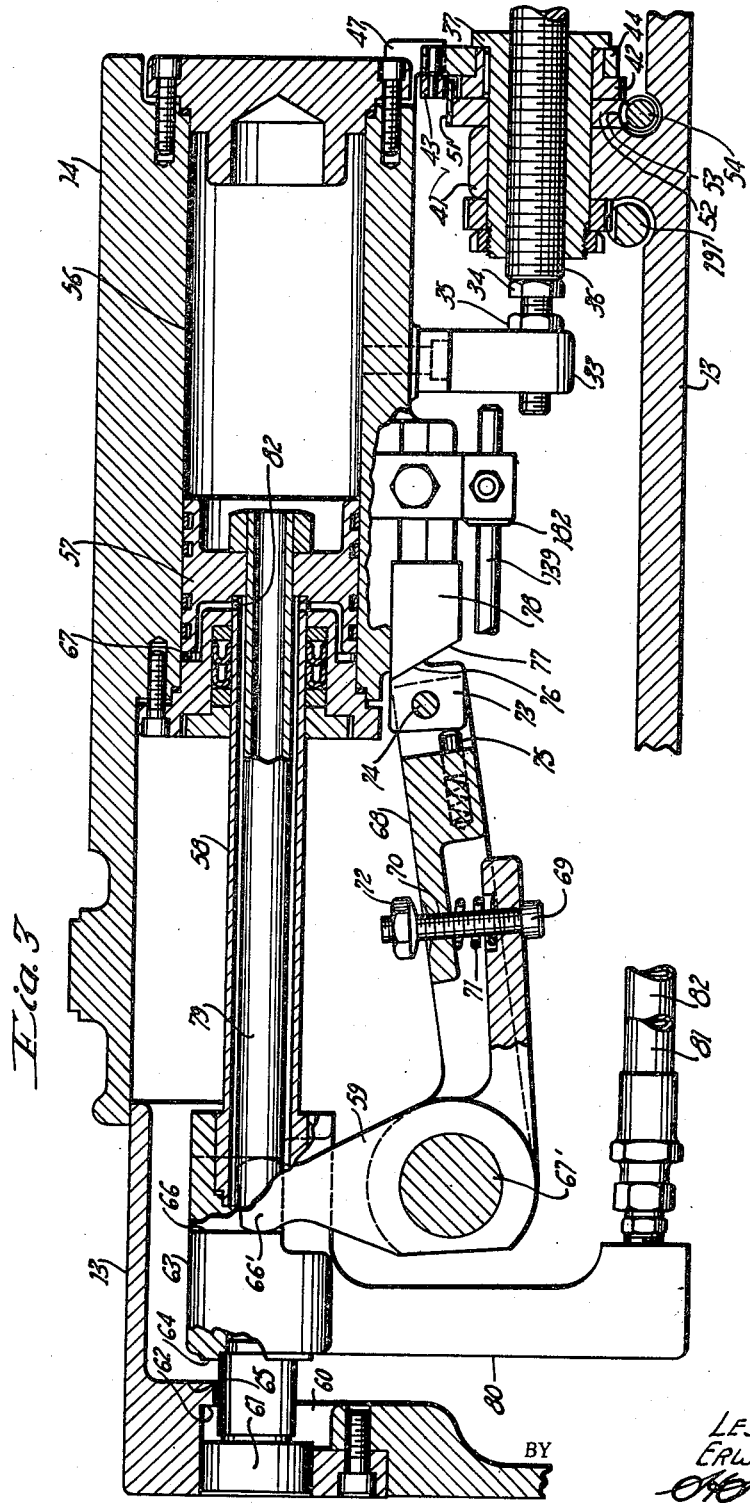

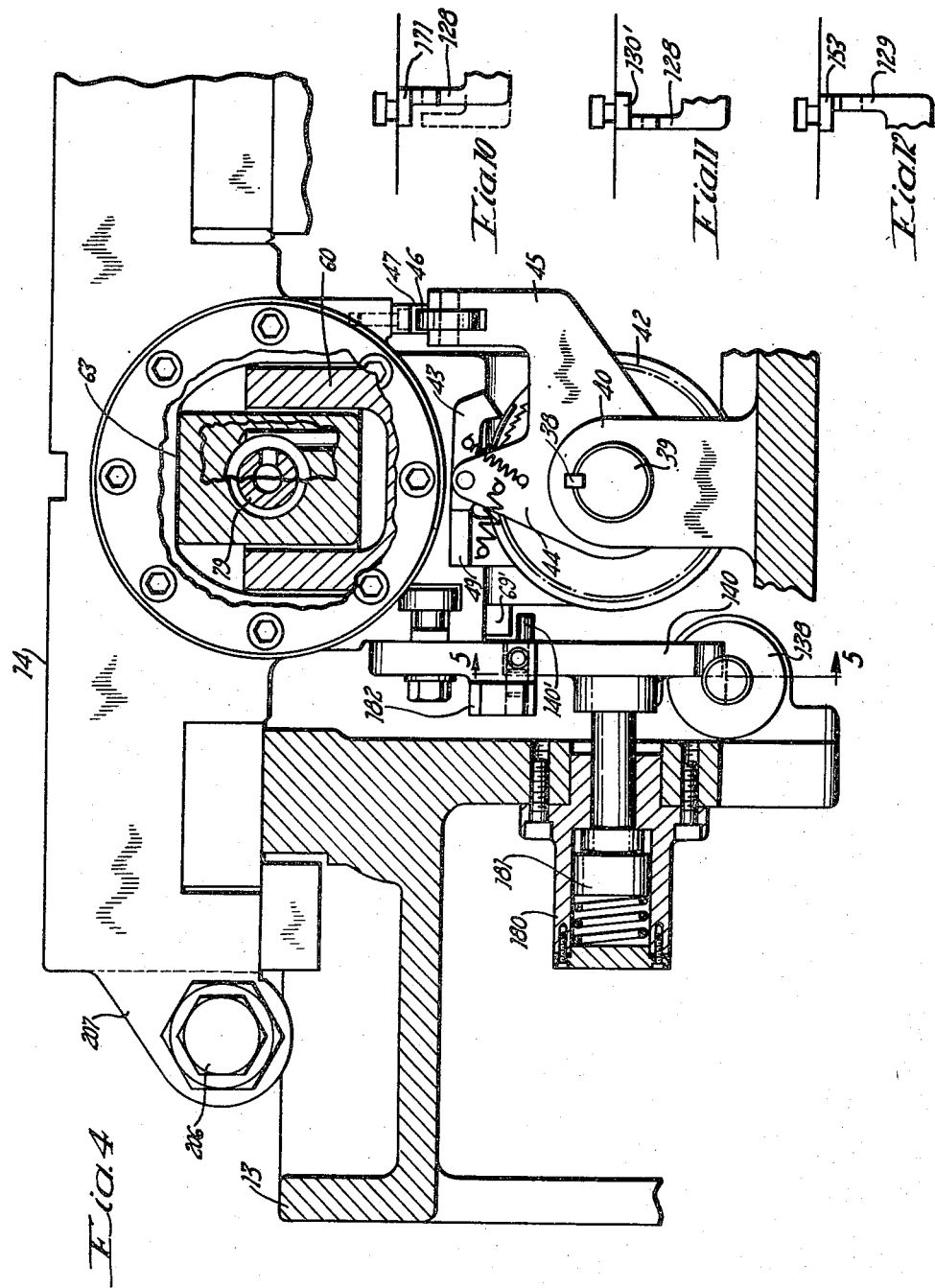

July 29, 1941.   L. F. NENNINGER ET AL   2,251,154
MULTIPLE STROKE BROACHING MACHINE
Filed Jan. 3, 1939   5 Sheets-Sheet 4
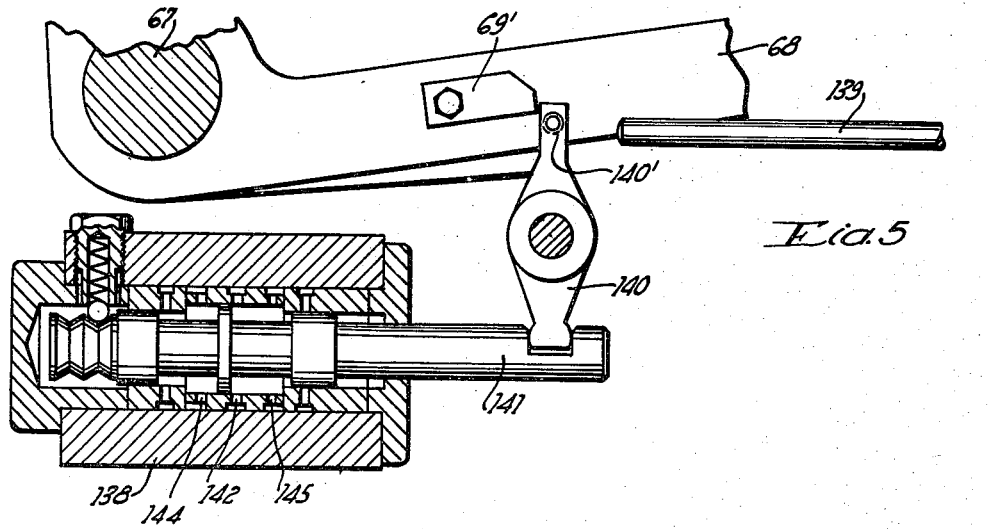
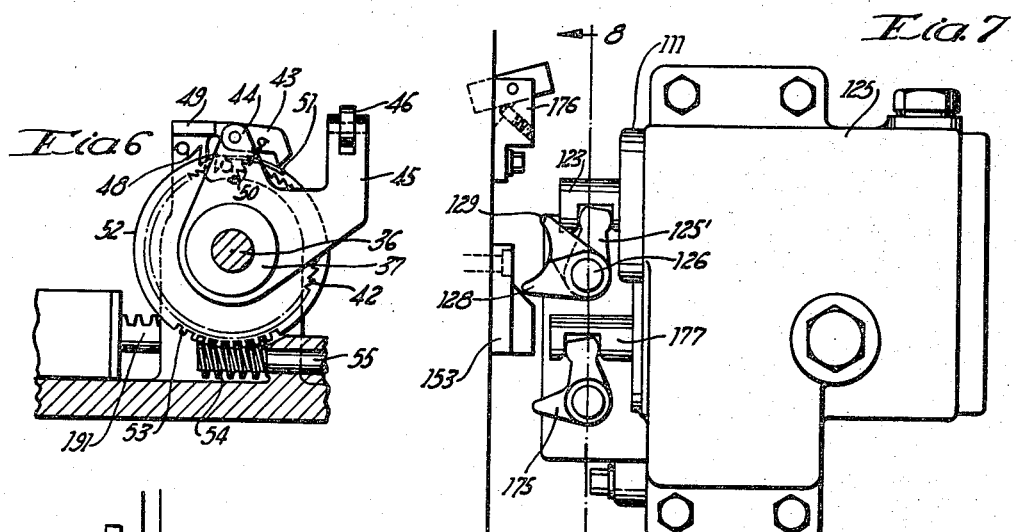
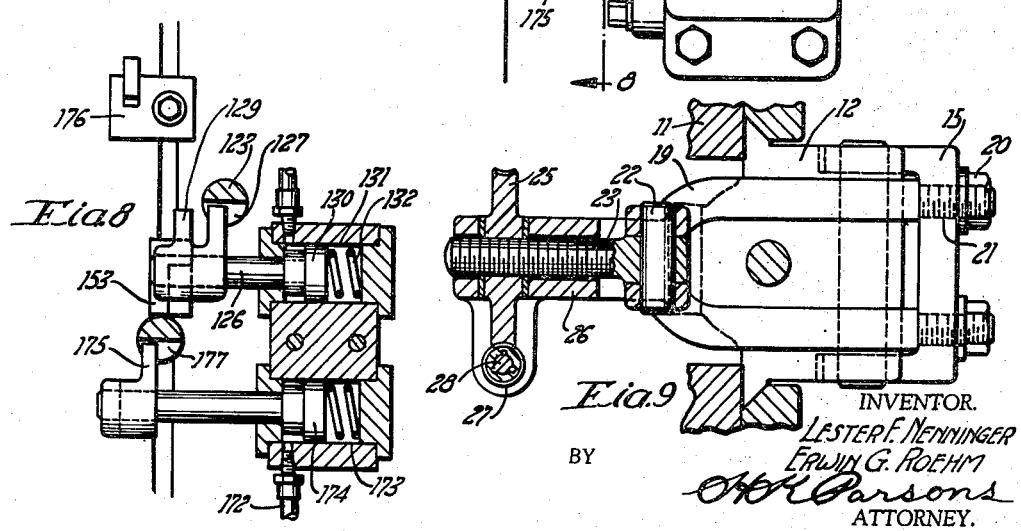
INVENTOR.
LESTER F. NENNINGER
ERWIN G. ROEHM
BY
A. H. Parsons
ATTORNEY.

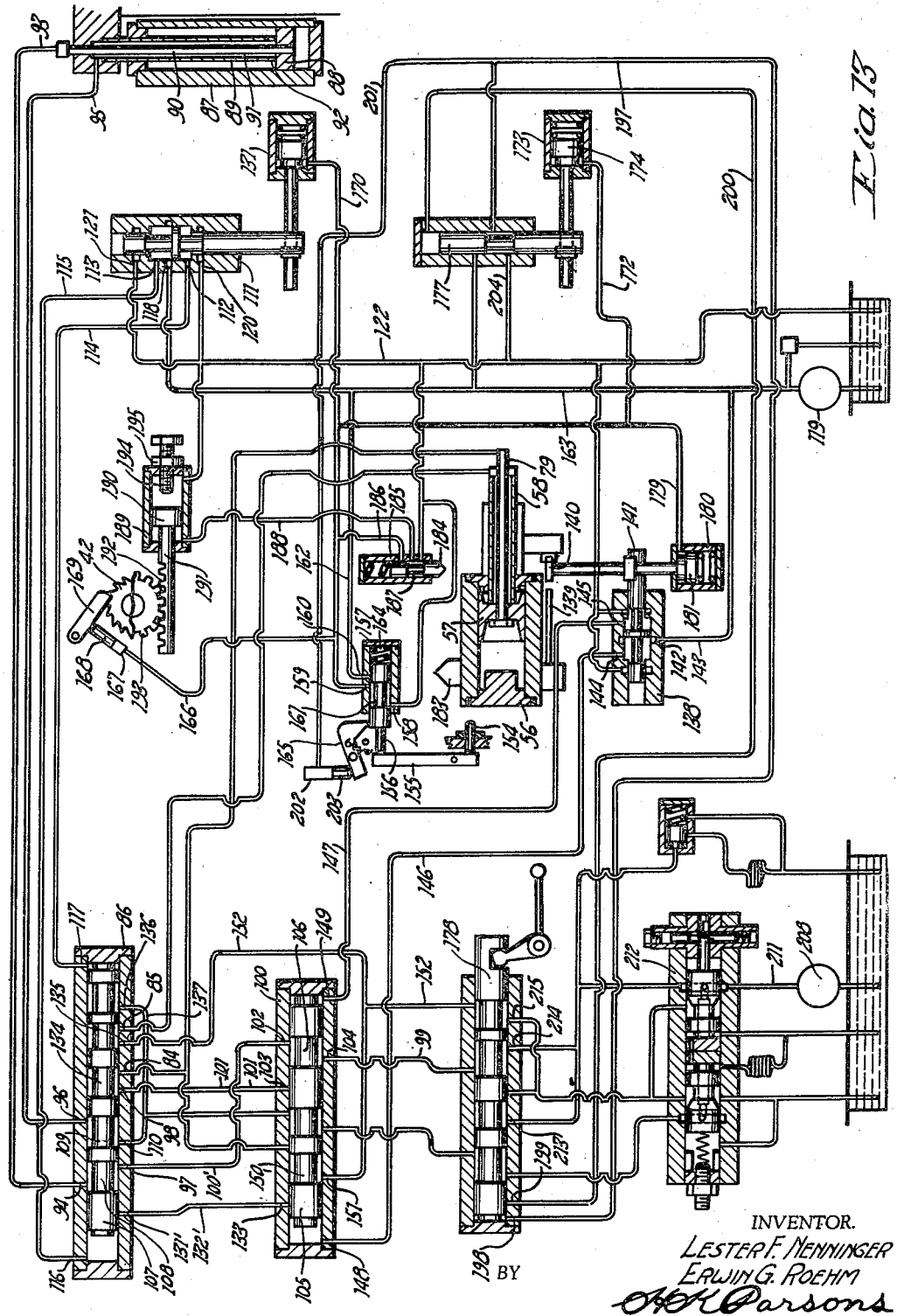

Patented July 29, 1941

2,251,154

UNITED STATES PATENT OFFICE 2,251,154

MULTIPLE STROKE BROACHING MACHINE

Lester F. Nenninger, Cincinnati, and Erwin G. Roehm, Norwood, Ohio, assignors to The Cincinnati Milling Machine Co., Cincinnati, Ohio, a corporation of Ohio Application January 3, 1939, Serial No. 249,036

17 Claims. (Cl. 90—33)

This invention relates to machine tools and more particularly to improvements in broaching machines.

It is well-known that the design of present-day surface broaching machines is controlled in a large measure by the thickness of stock to be removed from the work. This means that a machine different in one respect or another must be provided for each variation of this factor because the amount of stock to be removed determines the number of broaching teeth and the number of broaching teeth determines the length of the ram, and thus the length of ram movement. This, in turn, dictates the height or length of the machine. The utility of any particular broaching machine is thus limited to a narrow class of work if the machine is to be efficiently operated.

It is not economical to build a machine with a long ram movement in the hope of covering all cases and then only use the full movement a small percentage of the time. Furthermore, the height of the machine should be held within suitable limits since many shops cannot accommodate machines of very great height.

It is, therefore, an object of this invention to provide a broaching machine which is free of the above-named restrictions and therefore has capacity to handle any variation in thickness of stock and whereby it may be built in a universally usable size.

Another object of this invention is to provide a broaching machine which will operate substantially at full capacity regardless of variations in amount of stock to be removed.

A further object of this invention is to provide an improved automatic multiple stroke broaching machine which may be built in a practical convenient size and still have the stock removal capacity of present machines of a much greater size.

A still further object of this invention is to provide a broaching machine with means for adjusting the chip removal capacity per tooth of the broaching tool whereby a single multiple tooth broaching tool may have greater utility as respects variation in stock, thus eliminating the necessity for providing a special broaching tool for every variation in thickness of removable stock.

Still another object of this invention is to provide a multiple stroke broaching machine with a longitudinally indexible table which may be advanced after each ram stroke by an amount equal to the stock removal capacity of the broaching tool and to provide means for jointly controlling the adjustment of table index and the adjustment of chip removal capacity, whereby the one will be coordinated with the other.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a side elevational view of a machine embodying the principles of this invention.

Figure 2 is an end view of the machine shown in Figure 1 and as viewed from the right of that figure.

Figure 3 is an enlarged detailed section taken on the line 3—3 of Figure 2 showing the table actuating mechanism and indexible positive stop.

Figure 4 is an end view of the mechanism shown in Figure 3 with certain parts broken away to bring out features of construction.

Figure 5 is a detail section on the line 5—5 of Figure 4.

Figure 6 is a detail view of the ratchet operating mechanism for the indexible positive stop.

Figure 7 is an enlarged view of the trip controlled valve housing and operating dogs.

Figure 8 is a section on the line 8—8 of Figure 7.

Figure 9 is an enlarged detail section as viewed on the line 9—9 of Figure 1.

Figures 10, 11 and 12 are detail views showing the planes in which the respective trip dogs function.

Figure 13 is a diagrammatic view of the hydraulic control circuit.

In Figures 1 and 2 of the drawings, the reference numeral 10 indicates a bed upon which is mounted a column 11, which serves as a support or guide for a vertically movable ram 12, and a support 13 for a transversely movable work table 14. The ram 12 is provided with a broaching tool carrier 15 which is pivotally connected to the ram at 16 whereby the angle of the plane containing the cutting edges of the broaching tools may be varied and thus to vary the chip removal per tooth. The blades 17 are mounted in a holder 18 which is attached as a unit to the carrier 15.

It will be obvious that the blades may be mounted in the holder so as to project an equal amount from the face thereof whereby, when attached to the carrier, and the carrier 15 is swung into a vertical plane, no successive chip removal will be effected when the ram is moved. In other words, the amount of chip removal per tooth can be controlled entirely by the angle of inclination of the carrier with respect to the ram.

The blades may be alternatively mounted in the holder so as to project a predetermined differential amount beyond the preceding tooth whereby when the carrier is swung into a vertical plane the broaching tool as a whole will have a predetermined minimum of stock removal capacity and this minimum increased as the carrier is adjusted about its pivot.

The mechanism for adjusting the angle of the carrier is more particularly shown in Figure 9 to which reference may now be had. A bifurcated member 19 is connected to the carrier 15 by means of nuts 20 threaded on reduced ends 21 of the two legs of the member, and the other end of the member is pivotally connected as by a pin 22 to an adjusting screw 23. The adjusting screw has a threaded connection with a worm wheel 25 and a sliding fit in bores of a fixed bracket 26.

A worm 27 keyed to the upper end of a rotatable shaft 28 intermeshes with the worm wheel whereby upon rotation of the parts the carrier 15 will be positively moved and positively held in any position. The shaft 28 is journaled in the column as shown in Figure 1, and connected by bevel gearing 29 to a horizontal shaft 30 which has one end journaled in the table support 13.

The shaft 30 is connected by a pair of spiral gears 31 to a horizontal shaft 32 which projects through the side of the machine where it is provided with a graduated dial for effecting its rotation and indicating the setting of the broaching tool.

Means are provided in this machine for causing the ram to execute a series of strokes whereby successive layers of stock may be removed, the thickness of each layer depending upon the stock removal capacity setting of the broaching tool. It will be obvious, however, that after any given stroke of the broaching ram that the work must be indexibly advanced an amount equal to the thickness of the layer of stock removed, so that another layer of equal thickness may be removed on the next stroke. After each cutting stroke of the ram, the table supporting the work is retracted a sufficient amount to provide clearance so that the ram may be elevated without the broaching tools rubbing on the work.

The table is retracted a sufficient distance to cause a dog carried thereby to effect indexing of a positive stop whereby the table may advance on its next movement beyond its last cutting position by an amount equal to the broaching capacity of the tool. This additional movement may be termed herein the amount of index, which means the distance between successive advance positions of the table.

The indexible positive stop for the table is shown in Figures 3, 4 and 6.

Referring to Figure 3, the table 14 has a depending bracket 33 in which is threaded a bolt 34, the bolt being locked in position by a lock nut 35. This bolt is adapted to engage an indexible stop member 36 as the table advances toward the ram which is to the right in this figure.

The stop member 36 has a threaded engagement with a rotatable nut 37. The stop member is held against rotation by a fixed key 38 which engages a spline groove 39 formed in the stop member, the key being mounted in a bracket 40 through which the stop member slides. The nut 37 is held against axial movement relative to a supporting boss 41 which is integral with the support 13. A toothed ratchet wheel 42 is keyed to the nut and an oscillatable ratchet pawl 43 shown in Figure 6 is adapted to engage the teeth and thereby rotate the nut.

The pawl 43 is pivotally mounted in the end of a lever 44 which is supported for free rotation on the hub of the ratchet wheel 42 as more particularly shown in Figure 3. The lever 44 has an arm 45 in the end of which is mounted a roller 46 which is adapted to be engaged by a cam dog 47 carried on the under side of the table whereby for each reciprocation of the table the arm 45 is oscillated and the nut rotated through a predetermined angle, thereby causing a predetermined axial movement of the stop member 36.

A spring 48 returns the lever to the position shown in Figure 6 and a fixed abutment 49 is positioned to engage the heel of the pawl to thereby determine its return position. A second spring 50 continuously urges the pawl into engagement with the teeth of the ratchet wheel.

The cam 47 is adapted to oscillate the lever 45 through a constant angle. The operative engagement of the pawl with the teeth of the ratchet, however, is controlled by an adjustable plate 51 which is variably positionable between the pawl and the periphery of the ratchet wheel to determine the extent of angular movement of the pawl and lever before operative engagement of the pawl with the teeth of the ratchet. This plate, as shown in Figure 3, is attached to the periphery of a wheel 52 which has a series of teeth 53 cut in its periphery for engagement by a worm 54. The worm 54 is attached to the end of a shaft 55 which is operatively connected to the shaft 32. It will now be evident that plate 51 is shifted to increase or decrease the period of engagement of the pawl 43 with ratchet wheel 42 of nut 37 in correspondence with the increase or decrease in angular setting of the broaching tool carrier 15 through the connections including shafts 28 and 30 interconnecting worm wheel nut 25 on adjusting screw 23 with worm 54 for adjusting the position of plate 51. Thus, the amount of index of the table is simultaneously controlled with the variation in the angle of the broaching tool and the interconnecting parts are properly ratioed so that the amount of index will be zero when the cutting capacity of the broaching tool is zero, and subsequent increases in one are accompanied by corresponding increases in the other.

The table is provided with a cylinder 56 in which is mounted a piston 57 connected by a piston rod 58 to the support 13. This means that the piston is the stationary element and the cylinder is the moving element. The piston rod 58 does not have a solid connection with the support 13 but has a lost motion connection of sufficient amount to cause operation of a table locking lever 59.

The piston rod 58 passes through a bore 60 formed in the support 13 and is provided with an enlarged head 61 which is adapted to engage a shoulder 62 for limiting movement of the piston rod in one direction. A boss 63 carried by the piston rod has a shoulder 64 which is adapted to engage the face 65 of the support 13 for limiting movement in the opposite direction. The lever 59 has a bifurcated end 66' for engagement with grooves 66 formed on opposite sides of the member 63. The table 14 is shown in an extreme advanced position in Figure 3 and when pressure is admitted to chamber 67 the resultant reaction between the cylinder head and the piston will cause the latter to move first due to its mass being smaller relative to the mass of the table whereby in taking up the lost motion between the head 61 and the shoulder 62 the lever 59 will be rotated in a clockwise direction to remove the backstop. The lever 59 is in the form of a bell crank and is supported for rotation on a fixed pin 67', which also supports a second lever 68 for free rotation relative to the pin. The lever 68 is resiliently connected to the bell crank 59 in the following manner.

A bolt 69 is threaded in the bell crank and freely passes through a bore 70 formed in the lever 68. A spring 71 surrounds the bolt between the lever 68 and the bell crank 59. A nut 72 is threaded in the end of the bolt to limit the amount of separation effected by the spring. The lever 68 has a member 73 pivotally connected by a pin 74 to the end thereof and this member is continuously urged in a counterclockwise direction by a spring pressed plunger 75 carried by the lever. The member 73 has a face 76 which is adapted to engage a beveled face 77 formed integral with the underside of the table.

The object of this construction is to provide an adjustable extensible back stop for the table, it being obvious that when the table stops in its first advanced position the lever 68 will engage the lower end of the face 77. The spring 71 will be compressed. As the table advances to other positions the lever 68 will be rotated further under action of the spring 71 and engage further up on the face 77 to compensate for change in the displacement of the table.

The admission of pressure to chamber 67 causes the bell crank to rotate clockwise to withdraw the backstop lever and then the pressure continues to act to withdraw the table, or in other words, to move it to the left as viewed in Figure 3 to a retracted position. When pressure is admitted to the other end of the cylinder the piston moves in the opposite direction to cause rotation of the bell crank in a counterclockwise direction until the end of the lever 68 engages the underside of the block 78 which retards or stops movement of the piston 57 so that pressure can build up in the cylinder to cause advance of the table. When the table has advanced sufficiently for the block 78 to clear the end of the lever 68, the lever will move under the action of spring 71 and fill the gap between the face 77 and the pin 67' forming a positive backstop. This rotation will depend upon the amount the table is permitted to advance by the indexible stop 36.

Fluid pressure is supplied to the right hand end of cylinder 56 through a tube 79 mounted centrally of the piston rod 58, one end of the tube opening directly into the cylinder and the other end being connected through the boss 63 and depending leg 80 to a flexible hose connection 81. The tube 79 is purposely mounted in spaced relation to the outer tubular piston rod 58 so as to provide a passage for the fluid to the left end of the cylinder, the portion of the piston rod next to the piston having radial holes 82 through which the fluid may flow. The space between the inner and outer members of the piston rod is connected through the boss 63 and depending leg 80 to a second flexible tube 83. The tubes or channels 81 and 83 terminate in ports 84 and 85 of a selector valve 86.

The broaching ram 12 is reciprocated by a hydraulic motor of the piston and cylinder type, the cylinder 87 being fixed with the ram and the piston 88 being fixed with the column 11. The piston is connected to the column by a double tubular piston rod 89 which has an inner passage 90 communicating with the lower end of the cylinder and an intermediate passage 91 which communicates with the upper end of the cylinder through radial holes 92 formed in the wall of the tubing. The inner passage is connected by channel 93 to port 94, and the passage 91 is connected by channel 95 to port 96, of the selector valve.

The selector valve also has a pair of ports 97 and 98 which are alternately connectible to a pressure line 99 by a reversing valve 100. To this end, the ports 97 and 98 are connected by channels 100' and 101 to ports 102 and 103 of the reversing valve.

The pressure channel 99 terminates in port 104 of the reversing valve. When the reversing valve plunger 105 is in the position shown in Figure 13 the pressure port 104 is connected to port 102 by the annular groove 106 whereby port 97 of the selector valve is under pressure. When the selector valve plunger 107 is in the position shown, the pressure port 97 is connected to port 94 by the annular groove 108 whereby pressure fluid flows to the lower end of cylinder 87 to cause downward movement of the broaching ram. The port 96 is connected through annular groove 109 to exhaust port 110 whereby the fluid returning from the upper end of cylinder 87 may exhaust to reservoir.

The circuit is thus in a condition to cause downward movement of the ram, and it will be assumed for the present that the work table has already advanced the work to cutting position.

The selector valve plunger is adapted to be hydraulically shifted and this shifting is controlled by a pilot valve 111 which has a pair of ports 112 and 113 which are connected by channels 114 and 115 respectively to ports 116 and 117 located in opposite ends of the selector valve housing.

The pilot valve is provided with a pressure port 118 which is supplied from a different pump 119 than the one which supplies fluid for the operating circuit. The pilot valve also has a pair of exhaust ports 120 and 121 which are connected to a return channel 122. A plunger, 123, reciprocably mounted in the pilot valve, has an enlarged spool 124 whereby the plunger becomes self-actuating after it passes the center position.

As shown in Figure 7, the pilot valve is mounted in a housing 125 and, as shown in Figure 2, this housing is secured to the column 11 in adjacent relation to the reciprocating ram 112, whereby trip dogs carried by the ram can operate on the plunger 123. The plunger is shifted by a crank arm 125' which is fixed to a rotatable shaft 126, as shown in Figure 8, the crank engaging a slot 127 formed on the underside of the plunger. The crank arm has two trip fingers 128 and 129 formed integral therewith, which lie in different planes for actuation by different dogs.

The shaft 126 is provided with a piston 130 which is slidably mounted in a cylinder 131. A spring 132 normally maintains the piston at one end of the cylinder and thereby positions the trip finger 128 in the path of a trip dog 130', Figure 11. This last-named dog is positioned on the ram so as to cause tripping of the pilot valve after all of the roughing teeth on the broaching tool have passed by the work and before the finishing teeth indicated by the numeral 17' engage the work.

When the pilot valve is shifted, fluid pressure will be admitted to channel 114, causing shifting of the selector valve plunger 107 to its left hand position. This will result in port 94 being connected by cannelure 108 to port 131' and channel 132', the latter terminating in a closed port 133 of the reversing valve 100. The cylinder port 96 will be connected by groove 134 to port 98, channel 101 and closed port 103 of the reversing valve. It will now be seen that the fluid in opposite ends of the ram cylinder will be impounded and the ram will stop moving. At the same time the shifting of the selector valve plunger connected the table motor control ports 84 and 85 to ports 135 and 136 respectively.

The port 136 is connected by a branch line 137 to port 110 which is now connected by cannelure 109 to the pressure port 97 whereby fluid will flow through channel 101, interconnected ports 97—110, channel 137, interconnected ports 136—85 to channel 83 and thereby to the left hand end of the table cylinder, as viewed in Figure 3. The result will be, first, a withdrawal of the lever 68, and then a return movement of the table in a direction to withdraw the work from the path of the ram so that the ram may return without the cutting teeth rubbing on the work.

As the table retracts, means trip operable thereby stop the table in a retracted position and simultaneously initiate return movement of the broaching ram. This means comprises a second pilot valve 138 which, as shown in Figure 5, is mounted in adjacent relation to the table structure whereby a trip rod 139 carried by the table may rotate a pivoted trip lever 140 having an operative connection with the pilot valve plunger 141. The pilot valve has a pressure port 142 which is supplied through branch line 143 by the pump 119. It also has a pair of ports 144 and 145 which are connected by channels 146 and 147 to ports 148 and 149 located at opposite ends of the reversing valve. When the plunger 141 is shifted to the right, as viewed in Figure 5, or shifted to the left as viewed in Figure 13, pressure is connected to the right hand end of the reversing valve housing shifting the plunger 105 thereof to the left. This will result in the fluid pressure from port 104 flowing through port 103, channel 101, port 98, annular groove 134, port 96 and channel 95 to the upper end of the ram cylinder. The fluid from the other end of the cylinder will return to reservoir through port 94, annular groove 108 and port 131 of the selector valve, channel 132, port 133, annular groove 150 and port 151 of the reversing valve, to exhaust channel 152.

At the same time the port 102 of the reversing valve will close, thereby disconnecting fluid pressure from the table cylinder.

The broaching ram will continue its upward movement until a trip dog 153 engages trip finger 129, thereby actuating the pilot valve 111 whereby the selector valve plunger 107 will again be shifted to the right, Figure 12.

Since the port 98 is now under pressure due to the left hand position of the reversing valve, the shifting of the selector valve plunger will cause the port 98 to be connected through port 84 and channel 81 to the table cylinder 56 in a manner to cause the table to advance to its next cutting position. It will be remembered that on the return movement of the table, a dog 47 carried by the table actuated the indexing mechanism shown in Figure 6, thereby retracting the positive stop 36, shown in Figure 3, a predetermined amount whereby when the table advances this time it will move further toward the ram than it did on its last movement, thereby presenting a new layer of stock for removal by the ram.

As the backstop lever 68 moves into position behind the table, the dog 69' will rotate trip lever 140 through pin 140' and trip the pilot valve 138, thereby shifting the reversing valve plunger 105 to the right, disconnecting pressure from port 98 and connecting it to port 97. The valves will now be back to the position shown in Figure 13 and the broaching ram will start moving down on its next cutting cycle.

These cycles will be repeated until the table in making its last advance movement engages a trip rod 154 which as shown in Figure 13 will oscillate a lever 155 and thereby shift a plunger 156 of a pilot valve 157 to the right, closing port 158 and interconnecting a pair of ports 159 and 160 by means of an annular groove 161 formed in the plunger. The port 160 receives fluid pressure through channels 162 and 163 from pump 119. In order that the plunger 156 will be retained in this new position against the pressure of spring 164 when the table returns, a spring-actuated latch 165 is positioned to automatically drop into position and hold the plunger against the pressure of spring 164.

The interconnection of ports 159 and 160 causes a shifting of several trip controlled elements to the end that the broach ram will move a longer distance on its down stroke so that a set of finishing teeth may operate on the work and produce a satisfactory finish on the broached surface; that the table on its last return movement will move back to a work loading position; and that the positive stop will be reversely actuated to a zero cutting position. The port 159 has a first branch line 166 leading to a cylinder 167 having a contained piston 168 for withdrawing the pawl 169 from engagement with the ratchet wheel 42 whereby the ratchet wheel may be reversely rotated.

A second branch line 170 leads from port 159 to cylinder 131, which has the contained piston 130 for withdrawing the trip finger 128 from the path of dog 130' and positioning it in the path of a second dog 171 carried by the ram for actuating the pilot valve 111 later in the downward stroke of the ram, permitting the finishing teeth to operate on the work, Figure 10.

A third branch line 172 leads to cylinder 173 having a contained piston 174 for shifting a trip lever 175 into the path of a latch dog 176.

The trip lever 175 is operatively connected to a valve plunger 177 which acts as a pilot valve for controlling hydraulic shifting of the stop valve plunger 178. Attention is invited to the fact that the plunger 174 is shifted at the beginning of the down stroke of the ram and since it is not desired to actuate the stop valve at this time the dog 176 is so constructed that it will be ineffective on the down stroke of the ram but will become effective at a predetermined point in the return stroke.

A fourth branch line 179 connects the port 159 to a cylinder 180 having a contained piston 181 for shifting the trip lever 140 of pilot valve 138 out of the path of rod 139 and into the path of dog 182 carried by the table. This allows the table to retract to a work loading position.

It will thus be evident that when the table makes its last advance to position the work for the final cut, it causes a repositioning of the controls so that the machine will stop after the next cycle. On this cycle the ram descends a further distance than on previous cycles, the dog 171 functioning this time to trip the pilot valve 111, causing the ram to stop and the table to retract. As the table reaches the work loading position, the dog 182 trips the pilot valve 138 thereby stopping the table in a work loading position and starting the ram on its return stroke. Additionally, at this time another dog 183 on the table shifts the plunger 184 of a pilot valve 185 to which is connected a branch line 186 leading from port 159 of pilot valve 157. Thus, line 186 is under pressure so that when the plunger 184 is shifted an annular groove 187 in the plunger connects the pressure to channel 188 leading to cylinder 189.

This cylinder contains a piston 190 which has an integral piston rod 191 upon which are formed rack teeth 192 intermeshing with gear 193 keyed to the sleeve 37 of the positive stop mechanism as shown in Figure 3.

Upon the admission of pressure to cylinder 189 the gear 193 is reversely rotated to return the positive stop 36 to a starting position. This position corresponds to a zero cutting position, in the sense that if the table was advanced to engage the positive stop and the broaching ram descended it would remove no material from the work. This is for the reason that when a new setup is made while the table is in a work loading position the ratchet mechanism may operate during advance of the table the correct amount in accordance with the setting of the broaching tool.

The amount of movement effected by the piston 190 is controlled by a stop 194 which is threaded in the end of the cylinder 189 and provided with a lock nut 195. This stop may be adjusted to determine the zero position of the positive stop member 39.

Before the ram completes its return movement the latch dog 176 operates the pilot valve 177, thereby admitting pressure into the end of the stop valve 178 through interconnection of the fluid pressure in branch line 196 to channel 197.

The channel 197 terminates in port 198 in the stop valve. When the stop valve plunger 178 has completed its shifting movement the port 198 is connected with port 199, which, in turn, is connected through a return line 200 to the upper end of the valve 177. It will be noted that as soon as the pilot valve 177 has been operated by the latch dog, that the pressure admitted to channel 197 also flows through a branch line 201 to a cylinder 202 for operating a plunger 203 which releases the latch 165 and thereby permits the plunger 156 of the pilot valve 157 to return to the position shown in Figure 13. The result is the disconnection of pressure port 160 from port 159, and the connection of the latter to the exhaust port 158. This means that the pressure in cylinder 173 is released to reservoir so that the trip lever 175 is now shifted out of the path of the latch dog 176.

The pressure returning through channel 200 repositions the pilot valve plunger 177 whereby the channel 197 is now connected to the reservoir line 204. This allows the fluid in the left end of the stop valve to return to reservoir and permit immediate manual resetting of the stop valve in a running position, if so desired.

It also releases the pressure from cylinder 202 whereby the latch 165 is again free to operate.

Attention is invited to the fact that the last cutting position of the table is determined by the positive stops 205 shown in Figure 2 as located on the column on either side of the ram. Bolts 206 are adjustably mounted in integral lugs 207 projecting from opposite sides of the table as shown in Figures 2 and 4. These bolts are positioned to determine the final position of the table.

The operating circuit for the ram and table is supplied with fluid pressure from a pump 208 which has an intake 209 for withdrawing fluid from reservoir 210 and a delivery channel 211 which is connected through the relief valve 212 to ports 213 and 214 of the stop valve. When the stop valve is in running position the port 214 is connected to channel 99, and when in a stop position port 214 is connected to exhaust port 215.

It will be noted that the broaching ram is stopped near the upper end of its stroke, and with the table in a work loading position so that when the next work piece has been placed on the table, the ram must complete its upward stroke before starting down. This makes it possible for the ram to automatically initiate inward movement of the table before it starts down on a cutting stroke.

There has thus been provided an improved form of broaching machine tool effecting an automatic series of cutting strokes before it executes a final cutting stroke whereby the machine is not limited in its stock removal capacity and whereby it has greater utility than present machines.

It is claimed:

1. In a broaching machine having a reciprocable broaching ram and a table movable in a plane normal to the path of said ram, the combination of separate power actuable means for moving the table and ram, a source of power connectible for energizing said power actuable means, means controlling the power connections in a manner to cause alternate strokes of the ram and table, and a recedable positive stop for successively increasing the length of table movement whereby successive stock removal operations on the same work piece may be effected.

2. In a broaching machine having a reciprocable broaching tool carrying ram and a work table movable normal to the path of the ram, the combination of power operable means for alternately effecting one stroke of the ram and one stroke of the table, and ratchet operated means automatically effective for increasing the length of alternate strokes of the table whereby a series of stock removal operations may be performed in succession on the same work piece.

3. In a broaching machine having a reciprocable ram and a work table movable normal to the path of said ram, the combination of a broaching tool mounted on the ram having a capacity for removing a definite thickness of stock, power operable means for advancing the table into a first cutting position with respect to the broaching tool for effecting removal of said thickness of stock, and means to increase subsequent advance movements of the table by an amount equal to the thickness of said stock removal.

4. In a broaching machine having a reciprocable ram and table movable normal to one another, the combination with a broaching tool mounted on said ram having a stock removal capacity of a definite dimension, of power operable means for successively shifting the table and the ram, said table being movable to a first cutting position with respect to the tool, means to increase subsequent advance movement of the table by an amount equal to said dimension whereby successive stock removal operations on the same work piece may be performed, and means to vary said dimension as respects both the broaching tool and the table.

5. In a broaching machine having a reciprocable broaching ram, and a table movable in a plane normal to the path of the ram, the combination of a broaching tool holder adjustably mounted on the ram for determining the dimension of its stock removal capacity, adjustable means for determining a series of cutting positions for the table, said positions being spaced apart a predetermined amount, and means to simultaneously adjust the stock removal capacity of the broaching tool and the spacing of the cutting positions of the table.

6. In a broaching machine, the combination of a reciprocable broaching tool holder adjustable to vary its stock removal capacity, a work table movable normal to the path of reciprocation of the broaching tool into a series of spaced apart cutting positions, and adjusting means operatively connected for simultaneously increasing the stock removal capacity of said tool and the spacing of said cutting positions of the table.

7. In a broaching machine, the combination of a reciprocable broaching tool holder adjustable to vary its stock removal capacity, a work table movable normal to the path of the broaching tool into a series of spaced apart cutting positions, and adjusting means operatively connected for simultaneously and equally increasing the stock removal capacity of said tool and the spacing of said cutting positions.

8. In a broaching machine, the combination of a reciprocable broaching tool holder adjustable to vary its stock removal capacity, a work table movable normal to the path of the broaching tool into a series of spaced apart cutting positions and adjusting means operatively connected for simultaneously correspondingly varying the stock removal capacity of said tool and the spacing of said cutting positions of the table.

9. In a broaching machine, the combination of a reciprocable broaching tool holder adjustable to vary its stock removal capacity, a work table movable normal to the path of the broaching tool into a series of spaced apart cutting positions, and adjusting means operatively connected for simultaneously and equally correspondingly varying the stock removal capacity of said tool and the spacing of said cutting positions.

10. In a broaching machine having a reciprocable broaching ram, a broaching tool carried by said ram, a table movable to and from said ram, a common support for said ram and table, a positive stop member having a threaded connection with said support for limiting movement of the table toward the ram, and ratchet operated means to effect rotatable adjustment of said threaded stop member after each return stroke of the table to increase the amount of its advance on the next movement toward the ram.

11. In a broaching machine having a reciprocable broaching ram, a broaching tool carried by said ram, a table movable to and from said ram, a common support for said ram and table, a positive stop member having a threaded connection with said support for limiting movement of the table toward the ram, ratchet operated means to effect rotatable adjustment of said threaded stop member to increase the advancing movement of the table, and means to automatically return the positive stop member to a starting position after a predetermined series of broaching strokes by the ram have been completed.

12. In a broaching machine having a reciprocable broaching ram and a work supporting table movable in a path toward and from said ram, the combination of power operable means for reciprocating the ram, trip operable means for said power operable means for defining the stroke of said ram, said ram having a series of finishing teeth thereon, and means for automatically increasing the last stroke of the broaching ram to permit said finishing teeth to operate on the work.

13. In a broaching machine having a reciprocable broaching ram and a work supporting table reciprocable in a path relative to said ram, the combination of an adjustable stop for limiting the approach of the table toward the ram, a positive stop effective after a series of reciprocations of the table for determining the final limit of table movement toward the ram, means operable by the table for increasing the stroke of the ram for finishing purposes, a ratchet dog carried by the ram, and means operable by said dog for stopping the machine in a work loading position.

14. In a broaching machine having a broaching ram and a work supporting table, the combination of power operated means for effecting a series of alternate strokes of the ram and table whereby a series of stock removal operations on the same work piece may be performed, said means including a ratchet operated positive stop for the table whereby each approach movement of the table toward the ram may be increased, and means automatically operable in response to the last return movement of the table to reset said ratchet operated stop in a starting position.

15. In a broaching machine having a power reciprocable broaching ram and a broaching tool on said ram, the combination of a work supporting table, means including a piston and cylinder for advancing and retracting the table with respect to said ram, a positive stop for limiting relative movement between the piston and cylinder during advance of the table, and means for automatically indexing said stop to increase successive advance movements of the table.

16. In a broaching machine having a power reciprocable broaching ram and a broaching tool mounted on said ram, the combination of a work supporting table, fluid operable means for advancing and retracting the table relative to the ram, a source of fluid pressure, valve means controlled by the ram for connecting said fluid pressure to said fluid operable means to effect advance of the table and a positive stop for determining the length of movement to be imparted to the table by said fluid operable means, and means to effect automatic recession of the positive stop after each reciprocation of the ram to effect successive increases in the advance stroke of the table by said fluid operable means.

17. In a broaching machine having a power reciprocable broaching ram, a broaching tool on said ram, the combination of a work supporting table, fluid operable means for advancing the table toward the ram, a positive stop for limiting the length of movement imparted by said fluid operable means, means for automatically indexing said stop after each reciprocation of the ram to effect successive increases in the length of table movement, a positive back stop for holding the table against said positive stop and self-compensating means for rendering said backstop effective in spite of advances of the positive stop.

LESTER F. NENNINGER.
ERWIN G. ROEHM.